United States Patent
Campbell et al.

(10) Patent No.: US 12,448,897 B2
(45) Date of Patent: Oct. 21, 2025

(54) GAS TURBINE ENGINE COMPONENT FORMED BY CMCS AND HAVING A COMPRESSED INSERT WITH TAPERED ENDS

(71) Applicant: RTX Corporation, Farmington, CT (US)

(72) Inventors: Christian X. Campbell, West Hartford, CT (US); Kathryn S. Read, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,873

(22) Filed: Jan. 31, 2024

(65) Prior Publication Data
US 2025/0243769 A1     Jul. 31, 2025

(51) Int. Cl.
F01D 5/28     (2006.01)
F01D 9/04     (2006.01)

(52) U.S. Cl.
CPC ............. *F01D 5/282* (2013.01); *F01D 5/284* (2013.01); *F01D 9/041* (2013.01); *F05D 2300/6033* (2013.01); *Y10T 29/49337* (2015.01)

(58) Field of Classification Search
CPC .......... F01D 5/282; F01D 5/284; F01D 9/041; F05D 2300/6033; Y10T 29/49337
See application file for complete search history.

(56) References Cited

U.S. PATENT DOCUMENTS

| | | | | |
|---|---|---|---|---|
| 4,124,678 A | * | 11/1978 | Stroupe | B29C 70/02 264/314 |
| 4,470,862 A | * | 9/1984 | More | B29C 70/34 29/889.6 |
| 4,472,866 A | * | 9/1984 | Moracz | B23P 15/04 29/889.6 |
| 4,976,587 A | * | 12/1990 | Johnston | F03D 1/0675 416/239 |
| 5,042,968 A | * | 8/1991 | Fecto | B29D 99/0025 264/46.7 |
| 5,222,297 A | * | 6/1993 | Graff | B29C 70/865 29/889.7 |
| 5,292,231 A | * | 3/1994 | Lauzeille | F01D 5/282 416/229 A |
| 5,384,959 A | * | 1/1995 | Velicki | B23P 15/04 29/889.71 |

(Continued)

FOREIGN PATENT DOCUMENTS

| | | | | |
|---|---|---|---|---|
| EP | 2570611 A2 | 3/2013 | | |
| WO | WO-0232657 A1 | * 4/2002 | ............ | A01K 87/00 |
| WO | 2014/128418 A1 | 8/2014 | | |

OTHER PUBLICATIONS

European Search Report for EP Application No. 25155110.7 dated Jun. 24, 2025.

*Primary Examiner* — Brian Christopher Delrue
(74) *Attorney, Agent, or Firm* — Carlson, Gaskey & Olds, P.C.

(57) ABSTRACT

A component includes fabric layers of ceramic matrix composite ("CMC") fabric. The fabric has layers separated by an insert formed of the CMC fabric. The insert has at least one tapered end. The tapered end has a thickness which is less than a central thickness of the insert. A method is also disclosed.

20 Claims, 8 Drawing Sheets

(56) References Cited

U.S. PATENT DOCUMENTS

| | | | |
|---|---|---|---|
| 5,755,558 A * | 5/1998 | Reinfelder | B29C 70/302 29/889.7 |
| 5,789,061 A | 8/1998 | Campbell et al. | |
| 5,951,254 A * | 9/1999 | Sikorski | B32B 15/02 416/224 |
| 6,290,895 B1 * | 9/2001 | Wang | B29D 99/0025 425/389 |
| 6,532,658 B2 * | 3/2003 | Schreiber | B23P 15/04 29/889.7 |
| 8,309,477 B2 * | 11/2012 | Northfield | B32B 5/08 442/228 |
| 8,734,605 B2 | 5/2014 | Harrison | |
| 9,005,382 B2 | 4/2015 | Steibel et al. | |
| 9,505,188 B2 * | 11/2016 | Casazza | F03D 1/0675 |
| 9,664,053 B2 * | 5/2017 | Marshall | F01D 5/187 |
| 10,046,482 B2 * | 8/2018 | Marsal | F01D 5/282 |
| 10,293,559 B2 * | 5/2019 | Fernandes | B29C 70/446 |
| 10,399,285 B2 * | 9/2019 | Carlson | B32B 7/12 |
| 10,589,474 B2 * | 3/2020 | Tsai | B29C 70/30 |
| 10,737,449 B2 * | 8/2020 | Bernetich | B29C 70/549 |
| 10,914,176 B2 * | 2/2021 | Kamiya | B29C 70/304 |
| 11,401,030 B2 * | 8/2022 | Seminel | B29D 99/0028 |
| 11,465,731 B2 | 10/2022 | Douglas | |
| 11,927,113 B2 * | 3/2024 | Li | F01D 5/282 |
| 2001/0029668 A1 * | 10/2001 | Schreiber | B23P 15/04 29/889.7 |
| 2005/0076504 A1 * | 4/2005 | A. Morrison | F01D 9/044 29/889.7 |
| 2005/0084377 A1 * | 4/2005 | Dambrine | F04D 29/023 416/223 R |
| 2005/0260870 A1 * | 11/2005 | Marshall | B32B 27/08 439/67 |
| 2008/0014413 A1 * | 1/2008 | Tanabe | D04H 1/413 264/103 |
| 2009/0053070 A1 * | 2/2009 | Schilling | F01D 5/147 416/93 R |
| 2009/0068017 A1 * | 3/2009 | Rudling | F03D 1/0675 29/889.71 |
| 2010/0028594 A1 * | 2/2010 | Kray | F04D 29/023 428/114 |
| 2011/0243750 A1 * | 10/2011 | Gruhn | B29C 70/083 416/226 |
| 2013/0180642 A1 | 7/2013 | Blot et al. | |
| 2018/0363474 A1 | 12/2018 | Kittleson et al. | |
| 2019/0338658 A1 | 11/2019 | Weaver | |
| 2020/0101656 A1 * | 4/2020 | Fay | B32B 15/20 |
| 2023/0193527 A1 * | 6/2023 | Read | B32B 18/00 264/136 |

* cited by examiner

GAS TURBINE ENGINE COMPONENT FORMED BY CMCS AND HAVING A COMPRESSED INSERT WITH TAPERED ENDS

BACKGROUND OF THE INVENTION

This application relates to the formation of gas turbine engine components from ceramic matrix composite ("CMC") plies.

Gas turbine engines are known, and typically include a propulsor delivering air as propulsion for an associated aircraft. In addition, the air is delivered into a core engine where it reaches a compressor. Compressed air is delivered into a combustor where it is mixed with fuel and ignited. Products of this combustion pass downstream over turbine rotors, driving them to rotate.

It is known the products of combustion are quite hot, and thus maintaining the components in the turbine section becomes a challenge. It has been proposed to utilize CMCs to form components for the turbine section from a plurality of fiber layers. There are challenges in forming certain shapes relying upon the plies or fiber layers.

SUMMARY OF THE INVENTION

In a featured embodiment, a component includes fabric layers of ceramic matrix composite ("CMC") fabric. The fabric has layers separated by an insert formed of the CMC fabric. The insert has at least one tapered end. The tapered end has a thickness which is less than a central thickness of the insert.

In another embodiment according to the previous embodiment, the component is a vane for a gas turbine engine having an inner and outer platforms and an intermediate airfoil.

In another embodiment according to any of the previous embodiments, the airfoil has pressure and suction sides, and a rib at a location intermediate a leading edge and a trailing edge.

In another embodiment according to any of the previous embodiments, the at least one tapered end is part of said rib.

In another embodiment according to any of the previous embodiments, the insert has said at least one tapered end at each of two spaced ends.

In another embodiment according to any of the previous embodiments, there are a pair of said inserts.

In another embodiment according to any of the previous embodiments, a noodle formed of a material other than the fabric layers is positioned adjacent each of the pressure and suction sides and intermediate said two inserts.

In another embodiment according to any of the previous embodiments, the rib extends across the airfoil into bends adjacent each of the pressure and suction sides, and the at least two tapered ends on each of the two inserts are part of the bends.

In another embodiment according to any of the previous embodiments, the insert is formed of fabric tows and including tows extending in a direction between ends of the insert and tows extending perpendicular to the ends of the fabric layer, with some of the tows extending perpendicular to the ends to form the tapered ends, and at least one of the perpendicular tows adjacent one the ends being removed.

In another featured embodiment, a method of forming a component includes the steps of cutting a plurality of fabric layers and placing the plurality of fabric layers on a first mold half. The first mold half has at least one curved portion, bringing a second mold half onto the plurality of fabric layers to compress the fabric layers at an end associated with the at least one curved portion of the first mold half to form an insert having a thinner thickness at the at least one end than found at an intermediate portion spaced from the at least one end.

In another embodiment according to any of the previous embodiments, the first and second mold halves have curved portions at each of two ends such that a pair of spaced tapered portions are formed at spaced ends of the insert.

In another embodiment according to any of the previous embodiments, the compression occurs through a series of changing ones of one of the second mold halves such that the compression increases through the plurality of second mold halves.

In another embodiment according to any of the previous embodiments, the inserts are formed of fabric tows and including tows extending in a direction between the ends of the insert and tows extending perpendicular to the ends of the fabric layer, with at least one of the perpendicular tows adjacent the ends being removed.

In another embodiment according to any of the previous embodiments, the compression occurs in the presence of a binder layer.

In another embodiment according to any of the previous embodiments, the insert is allowed to partially dry between the intermediate compression steps.

In another embodiment according to any of the previous embodiments, the insert is then placed into a gas turbine engine component and on other fabric layers of CMC.

In another embodiment according to any of the previous embodiments, the compression occurs through a series of changing ones of one of the second mold halves such that the compression increases through the plurality of second mold halves.

In another embodiment according to any of the previous embodiments, the inserts are formed of fabric tows and including tows extending in a direction between the ends of the insert and tows extending perpendicular to the ends of the fabric layer, with at least one of the perpendicular tows adjacent the at least one end being removed.

In another embodiment according to any of the previous embodiments, the compression occurs in the presence of a binder layer.

In another embodiment according to any of the previous embodiments, the insert is then placed into a gas turbine engine component and on other fabric layers of CMC.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
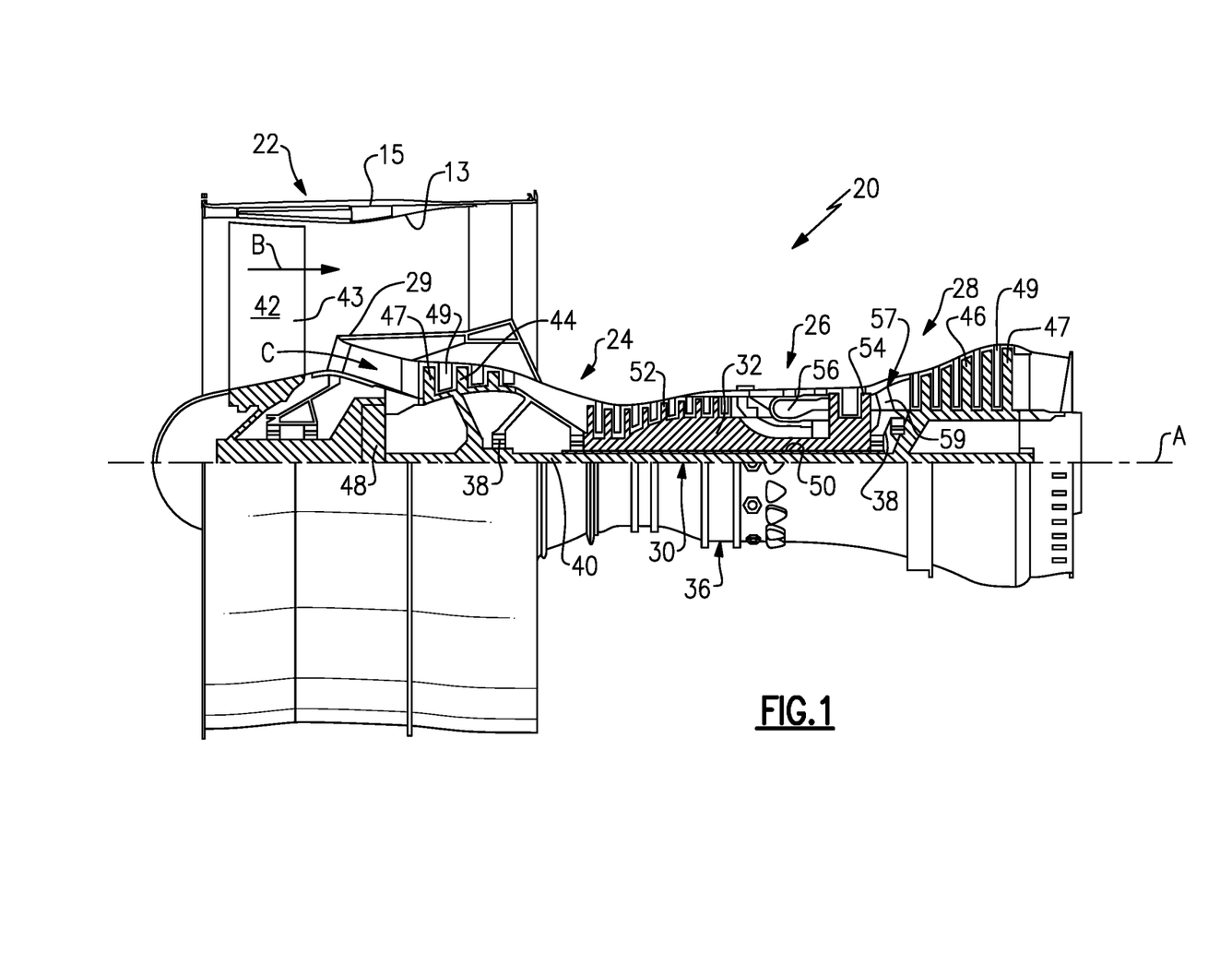
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
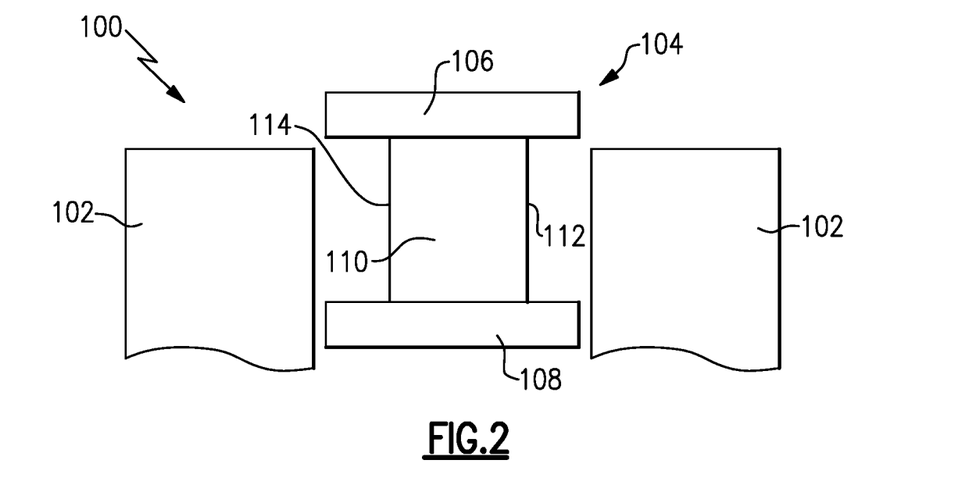
FIG. 2 schematically shows a turbine section.

FIG. 2 schematically shows a turbine section 100 having a pair of spaced rotating turbine blades 102. An intermediate static vane 104 is shown having an outer platform 106, an inner platform 108 and an intermediate airfoil 110. As known, the airfoil 110 extends between a leading edge 114 and a trailing edge 112.

Figure 3:
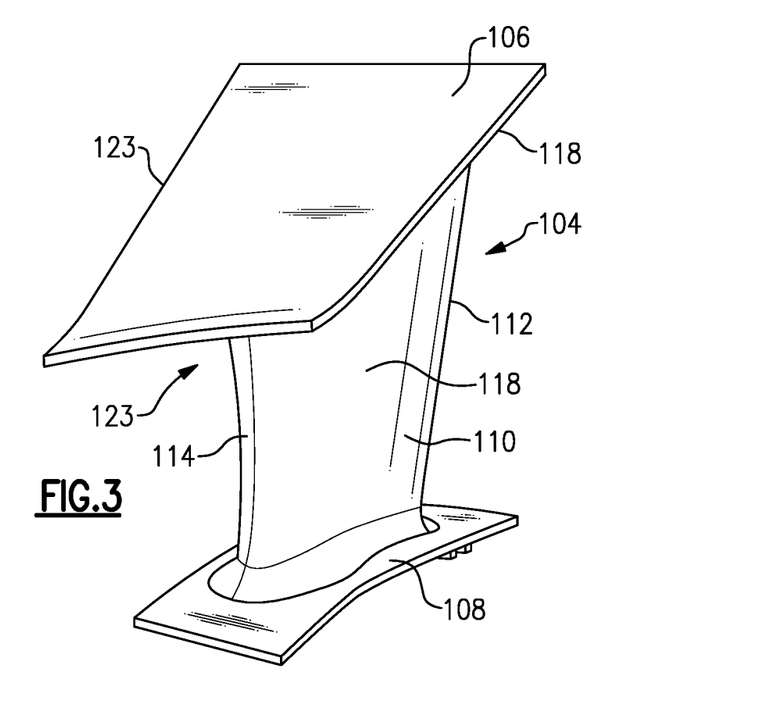
FIG. 3 shows a vane that might be incorporated in a turbine section.

FIG. 3 is a view of the vane 104. As known, there is a pressure side 118 and a suction side 123. The airfoil 110 merges into both of the platforms 106 and 108 along each of the pressure 118 and suction sides 123 and around the leading edge 114 and the trailing edge 112.

The vane 104 is formed of layers of ceramic matrix composite fabric plies.

A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

Figure 4:
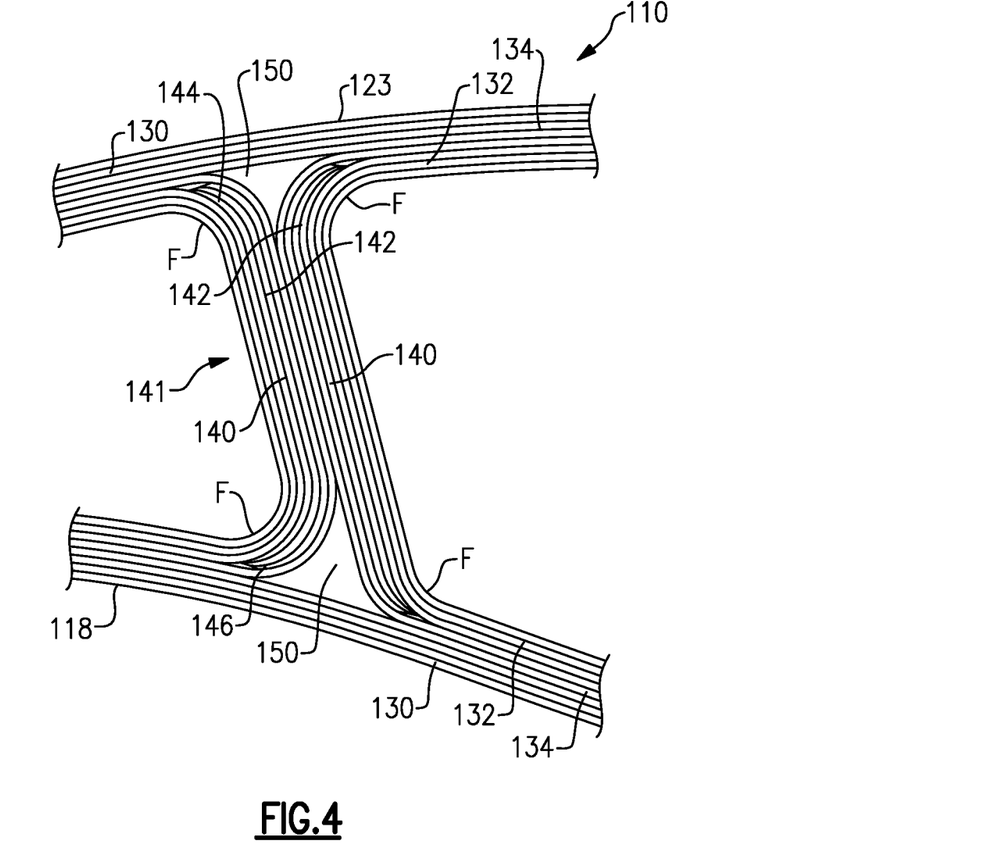
FIG. 4 is a cross-section through the FIG. 3 vane.

FIG. 4 shows a rib 141 extending between pressure side 118 and suction side 123 of airfoil 110. Outer fabric layers 130 and inner layers 132 extend across a central area of the airfoil 110 and through bends F and then forming layers of the suction and pressure walls 118 and 123. A layer 134 also extends through the airfoil 110. An intermediate member or insert 140 is placed between the layers 134 and 132 to assist in forming bends F.

The intermediate member 140 is compressed before being assembled into the FIG. 4 vane 104. As shown, the intermediate compressed product 140 has a central portion 142 of a first thickness and ends 144 and 146 which are tapered or squeezed to having a smaller thickness. Note, there are two intermediate compressed products 140 on opposed sides, and they bend in different directions. Intermediate noodles 150 are formed of materials other than the fabric plies to take up space between the fabric layers. Note noodles 150 are positioned adjacent each of the pressure and suction sides and intermediate the two inserts.

The airfoil has pressure 118 and suction sides 123, and rib 141 is at a location intermediate a leading edge and a trailing edge.

Structures other than the rib 141 of FIG. 4 will benefit from the teachings of this disclosure.

Figure 5A:
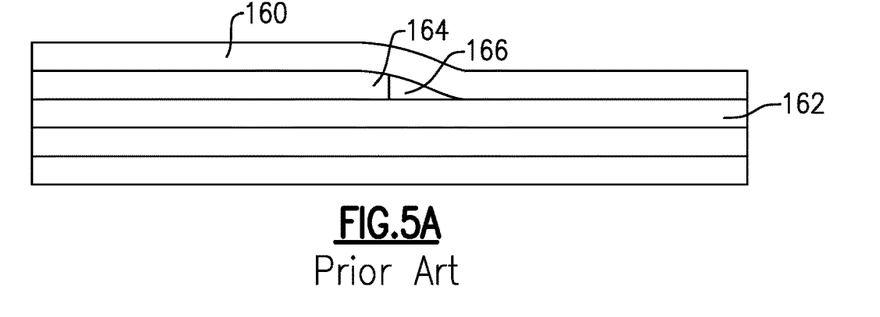
FIG. 5A shows a first challenge with the prior art.

FIG. 5A shows a challenge with the prior art when a component is to change a thickness. As shown, there are layers of fabric 160 and 162, and an intermediate layer 164. To reduce the wall thickness of the component a fiber tow layer 164 is "dropped." This leaves a space 166.

Figure 5B:
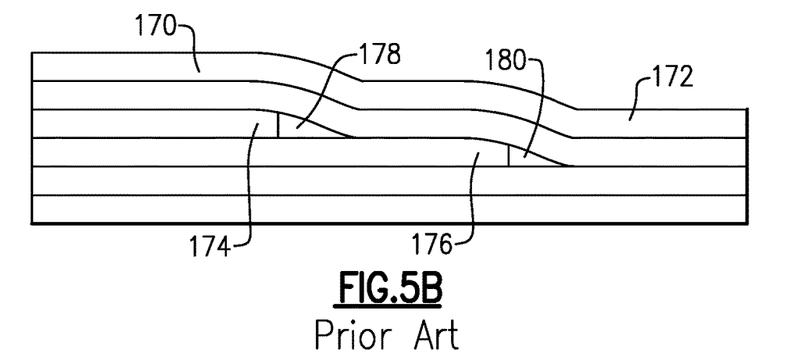
FIG. 5B shows a more pronounced problem in the prior art.

FIG. 5B shows an even greater challenge wherein a further reduction from the FIG. 5A thickness is performed. Here there are two tow drops at layers 174 and 176. For various reasons the ends of the layers 174 and 146 must be spaced by a minimum distance. As such, there are two hollows or voids 178 and 180.

Figure 5C:
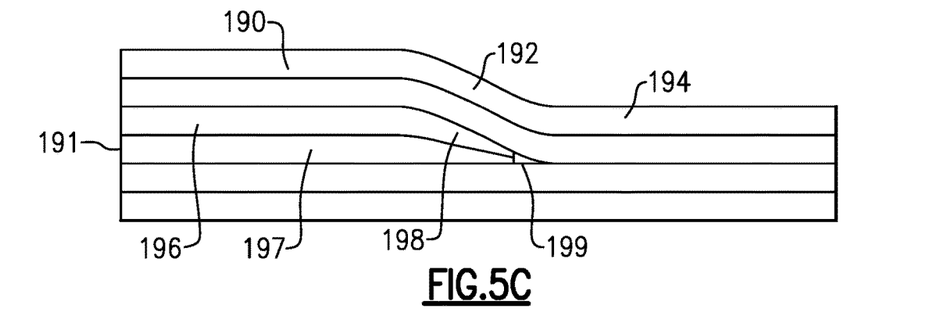
FIG. 5C shows a disclosed solution to the FIGS. 5A and 5B challenge.

FIG. 5C shows the use of a compressed intermediate member 191 with tapered or squeezed ends 198, such as intermediate member 140. Here, the outer layer 190 moves to a reduction area 192 to a thinner portion 194. The intermediate member 191 is formed of two layers 196 and 197 in this embodiment. As shown, one end is squeezed at 198, similar to that as shown in FIG. 4. The resulting space 199 is much smaller than that using the prior art method.

Figure 6A:
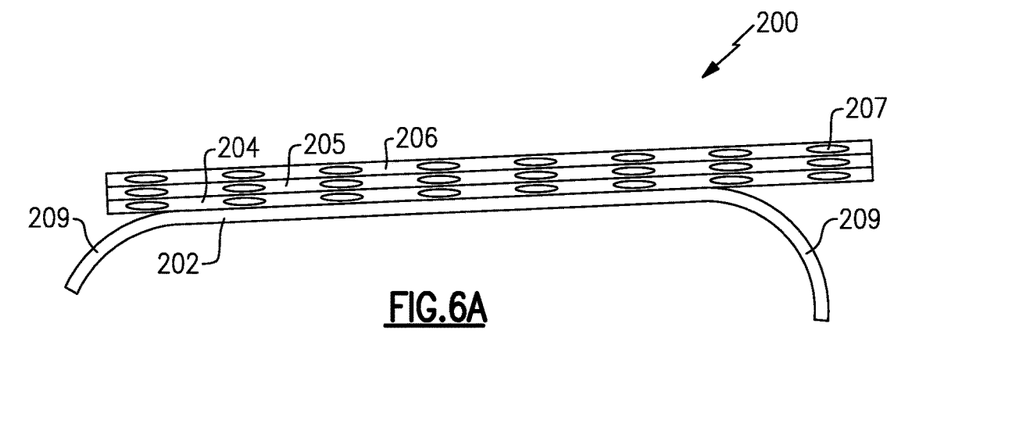
FIG. 6A shows a first step in forming the FIG. 5C product.

FIG. 6A shows a method 200 for providing the compressed component 140 and 191. Here a plurality of layers 204, 205 and 206 are each cut to a similar length. They are placed on a mold half 202. Weft tows 207 extend into the plane of this Figure. As can be appreciated, the mold 202 has bends 209 formed on a curve.

Figure 6B:
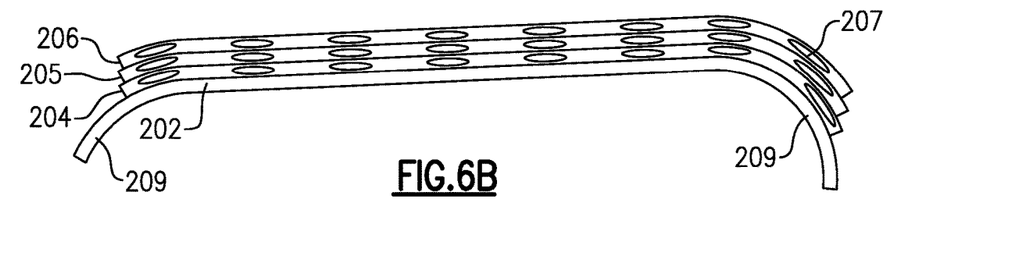
FIG. 6B shows a subsequent step.

As shown in FIG. 6B, the layers 204, 205 and 206 have ends which are staggered due to the different radius of curvature between the bottom layer 204 and the top layer 206.

Figure 6C:
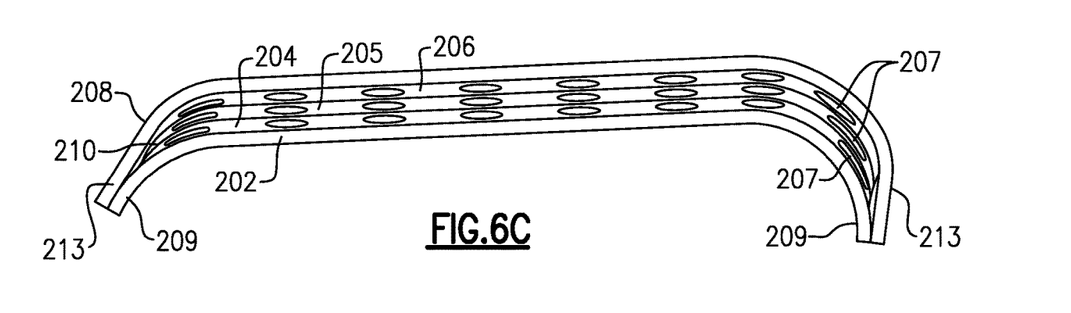
FIG. 6C shows another subsequent step.

As shown in FIG. 6C a second mold half 208 now compresses the layers 204, 205 and 206 to provide the squeeze or tapered end 210. Mold half 208 has curved ends 213 to squeeze the ends in combination with curves 209. As shown weft tows 207 are squeezed to elongate in the tapered end 210.

In embodiments, during this compacting, binder is provided. In the prior art, multiple layers have sometimes been cut separately and then assembled together. Cutting all of the layers at one time simplifies this operation. The compaction is done in the presence of the liquid-based binder such as PVA or PVB, that both lubricates the tows within the fabric and allows for sliding and holds the fabric together to stabilize it.

Figure 7:
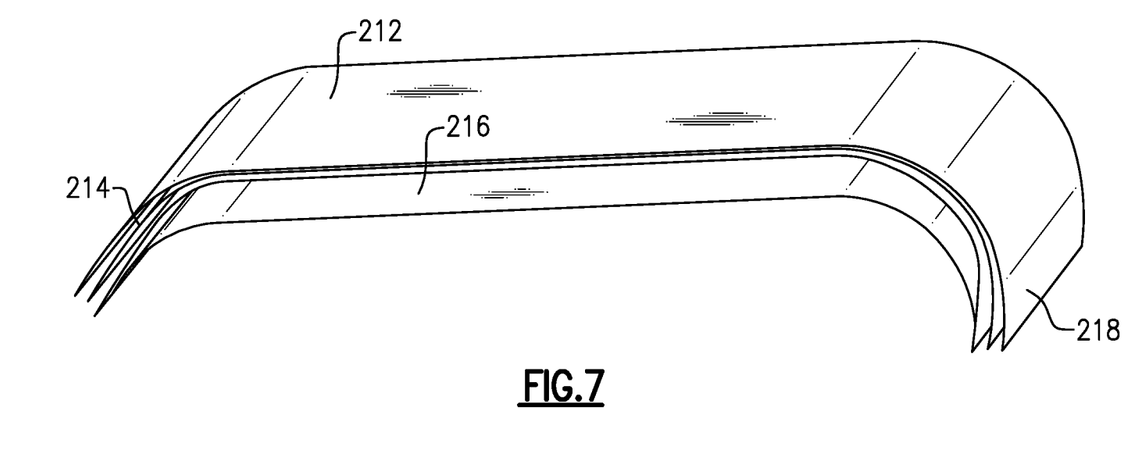
FIG. 7 schematically shows a plurality of molds for performing the method of FIGS. 6A-6C.

As shown in FIG. 7, there may be a plurality of the upper mold halves 212, 214 and 216 used in sequence. As can be appreciated, the curves at the end 218 provide increasing squeezing to form the final shape 210 as shown in FIG. 6C.

Figure 8A:
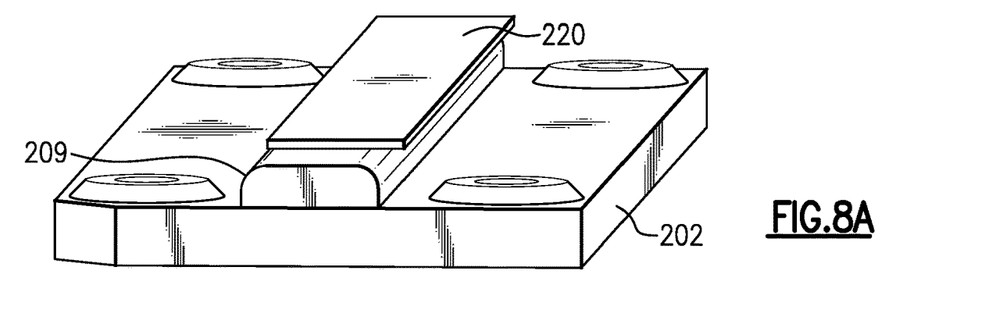
FIG. 8A shows an initial step.

FIG. 8A shows an initial step wherein the mold bottom 202 is provided with the cut fabric layers 220. The curved edges 209 are also shown.

Figure 8B:
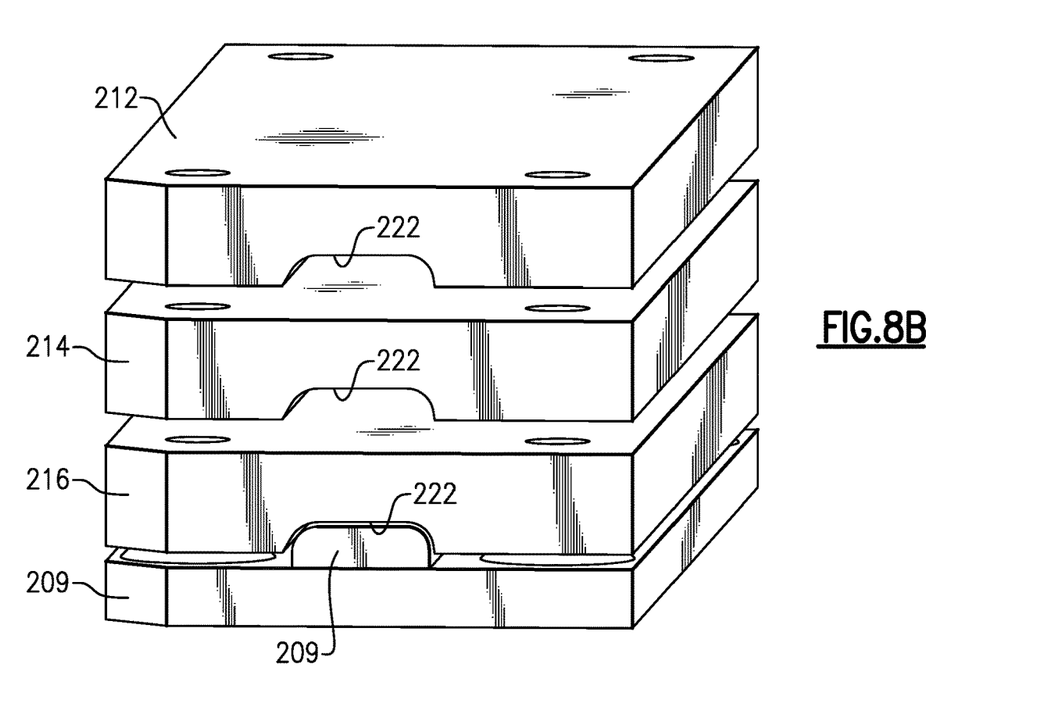
FIG. 8B shows a plurality of mold paths that may be utilized with the method.

FIG. 8B shows the base mold 202, and the plural molds 212, 214 and 216. As can be appreciated, each of the mold halves 212, 214 and 216 have a mold opening 222 that becomes increasingly small to provide the greater compaction. The intermediate tools 212 and 214 apply greater compaction on the edge than at the middle of the inserts. The final tool 216 may provide relatively uniform compaction to reach a target thickness for the insert.

The intermediate member, or insert, may be partially dried between compaction stages to stabilize the part to allow for tool removal or to exchange the tools. Additional binder may be added to facilitate the forming process.

Figure 8C:
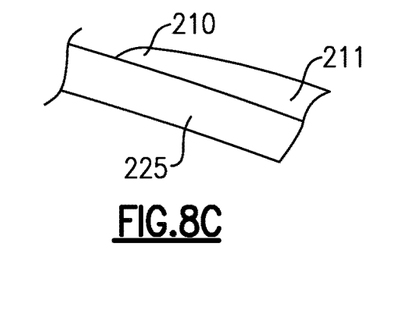
FIG. 8C shows a step subsequent to FIG. 8B.

FIG. 8C shows the compressed insert 211 having the tapered or squeezed end 210 placed on fabric layers 225.

Figure 8D:
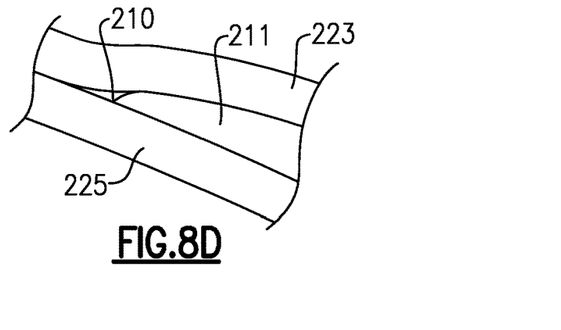
FIG. 8D shows a step subsequent to FIG. 8C.

FIG. 8D show a subsequent step wherein an outer layer 223 is then placed on top of the insert 211.

Figure 9:
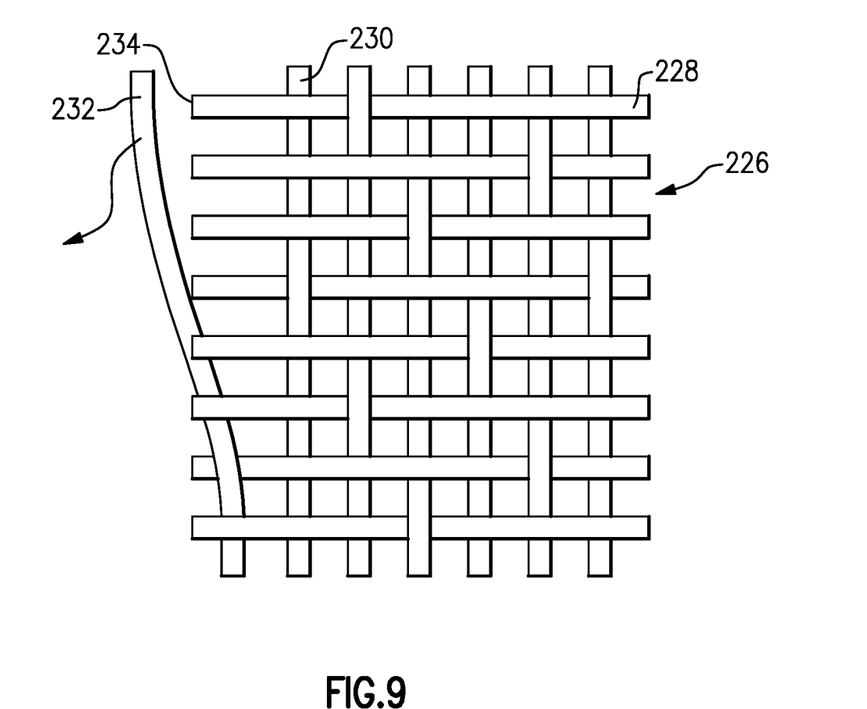
FIG. 9 shows an optional step in the disclosed method.

FIG. 9 shows an optional step which may facilitate the method of this disclosure in which a layer 226 has warp fiber tows 228 extending to an end 234 and weft fiber tows 230. A weft fiber tows(s) 232 adjacent the end 234 may be removed to facilitate the tapering or squeezing during the compaction.

While this disclosure has been shown for having an insert for forming two of the fillet in a gas turbine engine vane, it should be understood that other applications could benefit from this disclosure including inserts having only a single tapered end.

A component under this disclosure could be said to include fabric layers of ceramic matrix composite ("CMC") fabric. The fabric has layers separated by an insert formed of the CMC fabric. The insert has at least one tapered end. The tapered end has a thickness which is less than a central thickness of the insert.

A method of forming a component under this disclosure could be said to include the steps of cutting a plurality of fabric layers and placing the plurality of fabric layers on a first mold half. The first mold half has at least one curved portion. A second mold half is closed onto the plurality of fabric layers to compress the fabric layers at an end associated with the at least one curved portion of the first mold half to form an insert having a thinner thickness at the at least one end than found at an intermediate portion.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A method of forming a component comprising the steps of:
cutting a plurality of fabric layers and placing the plurality of fabric layers on a first mold half, the first mold half having at least one curved portion;
bringing a second mold half onto the plurality of fabric layers to compress the fabric layers at an end associated with the at least one curved portion of the first mold half to form an insert having a thinner thickness at the at least one end than found at an intermediate portion spaced from the at least one end; and
wherein the compression occurs through a series of changing ones of one of the second mold halves such that the compression increases through the plurality of second mold halves.

2. The method as set forth in claim 1, wherein the compression occurs in the presence of a binder layer.

3. The method as set forth in claim 1, wherein the insert is allowed to partially dry between the intermediate compression steps.

4. The method as set forth in claim 1, wherein the compression occurs in the presence of a binder layer.

5. The method as set forth in claim 1, wherein the insert is then placed into a gas turbine engine component and on other fabric layers of CMC.

6. A method of forming a component comprising the steps of:
cutting a plurality of fabric layers and placing the plurality of fabric layers on a first mold half, the first mold half having at least one curved portion;
bringing a second mold half onto the plurality of fabric layers to compress the fabric layers at an end associated with the at least one curved portion of the first mold half to form an insert having a thinner thickness at the at least one end than found at an intermediate portion spaced from the at least one end; and
wherein the inserts are formed of fabric tows and including tows extending in a direction between the ends of the insert and tows extending perpendicular to the ends of the fabric layer, with at least one of the perpendicular tows adjacent the at least one end being removed.

7. The method as set forth in claim 6, wherein said first and second mold halves have curved portions at each of two ends such that a pair of spaced tapered portions are formed at spaced ends of the insert.

8. The method as set forth in claim 7, wherein the compression occurs through a series of changing ones of one of the second mold halves such that the compression increases through the plurality of second mold halves.

9. The method as set forth in claim 8, wherein the inserts are formed of fabric tows and including tows extending in a direction between the ends of the insert and tows extending perpendicular to the ends of the fabric layer, with at least one of the perpendicular tows adjacent the ends being removed.

10. The method as set forth in claim 9, wherein the compression occurs in the presence of a binder layer.

11. The method as set forth in claim 10, wherein the insert is allowed to partially dry between the intermediate compression steps.

12. The method as set forth in claim 11, wherein the insert is then placed into a gas turbine engine component and on other fabric layers of CMC.

13. The method as set forth in claim 6, wherein the compression occurs through a series of changing ones of one of the second mold halves such that the compression increases through the plurality of second mold halves.

14. The method as set forth in claim 6, wherein the compression occurs through a series of changing ones of one of the second mold halves such that the compression increases through the plurality of second mold halves.

15. The method as set forth in claim 11, wherein the insert is then placed into a gas turbine engine component and on other fabric layers of CMC.

16. A method of forming a component comprising the steps of:
cutting a plurality of fabric layers and placing the plurality of fabric layers on a first mold half, the first mold half having at least one curved portion;
bringing a second mold half onto the plurality of fabric layers to compress the fabric layers at an end associated with the at least one curved portion of the first mold half to form an insert having a thinner thickness at the at least one end than found at an intermediate portion spaced from the at least one end; and
wherein the insert is then placed into a gas turbine engine component and on other fabric layers of CMC.

17. The method as set forth in claim 16, wherein said first and second mold halves have curved portions at each of two ends such that a pair of spaced tapered portions are formed at spaced ends of the insert.

18. The method as set forth in claim 17, wherein the compression occurs through a series of changing ones of one of the second mold halves such that the compression increases through the plurality of second mold halves.

19. The method as set forth in claim 18, wherein the inserts are formed of fabric tows and including tows extending in a direction between the ends of the insert and tows extending perpendicular to the ends of the fabric layer, with at least one of the perpendicular tows adjacent the ends being removed.

20. The method as set forth in claim 19, wherein the compression occurs in the presence of a binder layer.

* * * * *